(12) United States Patent
Nilsson et al.

(10) Patent No.: US 9,160,843 B2
(45) Date of Patent: Oct. 13, 2015

(54) SPEECH SIGNAL PROCESSING TO IMPROVE NATURALNESS

(75) Inventors: Mattias Nilsson, Sundbyberg (SE);
Stefan Strommer, Stockholm (SE);
Soren Vang Andersen, Luxembourg (LU)

(73) Assignee: Skype, Dublin (IE)

( * ) Notice: Subject to any disclaimer, the term of this patent is extended or adjusted under 35 U.S.C. 154(b) by 849 days.

(21) Appl. No.: 12/924,848

(22) Filed: Oct. 6, 2010

(65) Prior Publication Data

US 2011/0137644 A1    Jun. 9, 2011

(30) Foreign Application Priority Data

Dec. 8, 2009 (GB) .................................. 0921468.5

(51) Int. Cl.
| | | |
|---|---|---|
| *G10L 21/02* | (2013.01) | |
| *H04M 3/40* | (2006.01) | |
| *H04M 7/00* | (2006.01) | |
| *H04M 1/253* | (2006.01) | |

(Continued)

(52) U.S. Cl.
CPC ............. *H04M 3/40* (2013.01); *G10L 21/0232* (2013.01); *G10L 21/0364* (2013.01); *H04M 1/2535* (2013.01); *H04M 7/0069* (2013.01)

(58) Field of Classification Search
CPC .............. H04M 1/2535; H04M 7/0069; G10L 21/0232; G10L 21/0364
USPC ........... 704/219, 270; 375/230, 232; 455/307, 455/312; 379/388, 400
See application file for complete search history.

(56) References Cited

U.S. PATENT DOCUMENTS

| | | |
|---|---|---|
| 4,581,747 A | 4/1986 | Prezas et al. |
| 5,195,132 A | 3/1993 | Bowker et al. |
| 5,280,525 A * | 1/1994 | Wesel ........................ 379/400 |

(Continued)

FOREIGN PATENT DOCUMENTS

| | | |
|---|---|---|
| DE | 38 86 460 T2 | 6/1994 |
| EP | 0 539 017 A2 | 4/1993 |

(Continued)

OTHER PUBLICATIONS

Notification of Transmittal of the International Search Report and the Written Opinion of the International Searching Authority, or the Declaration, mailed on Jun. 17, 2011, for Application No. PCT/EP2010/069104, consisting of 19 pages.

(Continued)

*Primary Examiner* — Jialong He
(74) *Attorney, Agent, or Firm* — Danielle Johnston-Holmes; Micky Minhas

(57) ABSTRACT

A method, terminal and program for processing a speech signal, in which the speech signal is received over a network from a transmitting device, wherein the frequency components in the received speech signal are limited to a predetermined frequency range and the received speech signal has been filtered using a transmitter frequency response over the predetermined frequency range. The received speech signal is decoded. The decoded speech signal is filtered using a receiver frequency response which is complementary to the transmitter frequency response over the predetermined frequency range to thereby reduce distortion in the speech signal introduced over the predetermined frequency range by using said transmitter frequency response.

19 Claims, 5 Drawing Sheets

(51) Int. Cl.
*G10L 21/0232* (2013.01)
*G10L 21/0364* (2013.01)

(56) References Cited

U.S. PATENT DOCUMENTS

| | | | |
|---|---|---|---|
| 5,450,442 A * | 9/1995 | Umemoto et al. | 375/230 |
| 5,471,527 A * | 11/1995 | Ho et al. | 379/347 |
| 6,011,853 A * | 1/2000 | Koski et al. | 381/56 |
| 6,141,341 A | 10/2000 | Jones et al. | 370/352 |
| 6,236,846 B1 * | 5/2001 | Uchimura et al. | 455/312 |
| 6,560,457 B1 * | 5/2003 | Silver et al. | 455/445 |
| 6,912,496 B1 | 6/2005 | Bhattacharya et al. | |
| 7,490,036 B2 * | 2/2009 | Jasiuk et al. | 704/219 |
| 8,180,064 B1 * | 5/2012 | Avendano et al. | 381/73.1 |
| 2001/0022812 A1 * | 9/2001 | Ise et al. | 375/232 |
| 2002/0086653 A1 * | 7/2002 | Kim | 455/307 |
| 2002/0162116 A1 * | 10/2002 | Read et al. | 725/106 |
| 2003/0039351 A1 * | 2/2003 | Moquin | 379/388.01 |
| 2004/0172241 A1 | 9/2004 | Mahe et al. | |
| 2006/0014570 A1 * | 1/2006 | Marx et al. | 455/569.1 |
| 2006/0023700 A1 * | 2/2006 | Usuba et al. | 370/352 |
| 2006/0158310 A1 * | 7/2006 | Klatsmanyi et al. | 340/10.1 |
| 2006/0203800 A1 * | 9/2006 | Nejah | 370/352 |
| 2006/0282262 A1 | 12/2006 | Vos et al. | |
| 2007/0049329 A1 * | 3/2007 | Mayer et al. | 455/552.1 |
| 2008/0249772 A1 * | 10/2008 | Martynovich et al. | 704/233 |
| 2009/0281800 A1 | 11/2009 | LeBlanc et al. | |

FOREIGN PATENT DOCUMENTS

| | | |
|---|---|---|
| EP | 0 651 542 A2 | 5/1995 |
| EP | 0 705 016 A2 | 4/1996 |
| FR | 2 741 744 A1 | 5/1997 |
| GB | 2466675 A | 7/2010 |
| GB | 2476043 | 6/2011 |

OTHER PUBLICATIONS

Qian, Y., et al., "Combining Equalization and Estimation for Bandwidth Extension of Narrowband Speech," *IEEE*, pp. I-713-I-716 (2004).
Search Report Under Section 17, UK Application No. GB0921468.5 dated Apr. 11, 2011, 2 pp.

* cited by examiner

SPEECH SIGNAL PROCESSING TO IMPROVE NATURALNESS

RELATED APPLICATION

This application claims priority under 35 U.S.C. §119 or 365 to Great Britain Application No. 0921468.5, filed Dec. 8, 2009. The entire teachings of the above application are incorporated herein by reference.

FIELD OF THE INVENTION

The present invention relates to decoding speech signals, in particular to decoding received speech signals which have been filtered at the transmitting side of a communication, such filtering introducing frequency characteristics into the speech signals by way of a frequency response.

BACKGROUND

In conventional communication systems, telephonic devices are designed to receive speech signals (as acoustic signals) from a user and convert the speech signals to digital signals before encoding the speech signals in a speech encoder for transmission over the communication system. The telephonic devices are designed to yield a frequency response of the transfer function representing all stages from the acoustic signal to the digital signal that matches the characteristics of the sending Intermediate Reference System (IRS) specified in ITU-T P.48 standard, "Specification for an Intermediate Reference System", ITU-T Recommendation P.48, 1988. The frequency characteristics of the Intermediate Reference System according to ITU-T P.48 are shown in FIG. 1.

The frequency characteristics of the IRS provide an emphasis to the speech frequency band that is considered most important for speech intelligibility. That is, more weight is given to the second formant frequencies rather than to the first formant frequencies, which is known to increase intelligibility of clipped speech, as discussed in I. B Thomas, "The Influence of First and Second Formants on the Intelligibility of Clipped Speech," Journal of Audio Engineering Society, Vol. 16, No. 2, 1968. It can be seen in FIG. 1 that the speech signal is a narrowband signal with frequencies limited to the range 0 to 4 kHz. Frequency components of the speech signal below 2 kHz and above 3.4 kHz are attenuated by the frequency response of the IRS, whilst a gain is applied to frequency components of the speech signal between 2 kHz and 3.4 kHz by the frequency response of the IRS. It can also be seen that frequency components below 300 Hz are strongly attenuated.

By concentrating the energy of a narrowband signal into the second formant frequencies the intelligibility of the narrowband signal is improved, allowing improved intelligibility of a speech signal at a receiver of a call without increasing the bandwidth requirements.

Thus, conventional communication systems, for example the Public Switched Telephone Network (PSTN) based on fixed line and/or mobile networks, are designed to have average frequency responses as defined in the IRS specification, that emphasize the second formant frequencies. However, the increase in intelligibility of the speech signals comes at the expense of speech naturalness. A speech signal is distorted by applying the frequency response shown in FIG. 1 such that applying the frequency response alters the perception of the speech signal, i.e. it does not sound completely natural (or unaltered). The naturalness of the speech is affected because different levels of attenuation (or amplification) are applied to different frequency components of the speech signal (i.e. the frequency response shown in FIG. 1 is not flat).

In U.S. Pat. No. 5,195,132 by Bowker et al there is described a method of enhancing a speech signal transmitted between telephone stations, wherein the enhancement is performed at some point along the connection between the transmitting and receiving telephone stations, such that the speech signal is enhanced before arriving at the receiving telephone station. The frequency range 100 to 300 Hz is amplified relative to the remainder of the telephone passband before supplying the speech signals to the receiving telephone station.

In the paper by Y. Qian and p. Kabal "Combining Equalization and Estimation for Bandwidth Extension of Narrowband Speech", in *Proc. IEEE Int. Conf. Accoust. Speech Sign. Process.*, 2004, pp. 713-716 there is disclosed the use of a fixed equalizer to filter received speech signals prior to applying a system of Artificial Bandwidth Extension (ABE). The equalization is employed to expand the apparent bandwidth of the narrowband speech signal. Equalization is applied both at low frequencies as well as at high frequencies. Their equalizer is designed specifically for the ITU-G.712 specification (G.712 "transmission performance characteristics of pulse code modulation channels", ITU-T Recommendation G.712, November 1996) and provides a 10 dB gain in the frequency range 3.8 to 4 kHz and a 10 dB gain at 100 Hz. Between 100 and 3800 Hz the frequency response of the equalizer is essentially flat.

The two prior art systems described above apply fixed gains to particular sections of the speech signal, such as the low frequency components (e.g. 100-300 Hz) and/or the high frequency components (e.g. 3.8-4 kHz). This results in a different level of attenuation (or amplification) for different frequency components of the speech signal. Although the naturalness of the speech signal can be improved to a certain degree by the prior art systems described above, the speech signals will not sound completely natural when using one of the prior art systems described above.

It is an aim of embodiments of the present invention to improve the naturalness of the speech signal.

SUMMARY

According to a first aspect of the invention there is provided a method of processing a speech signal, the method comprising: receiving the speech signal over a network from a transmitting device, wherein the frequency components in the received speech signal are limited to a predetermined frequency range and the received speech signal has been filtered using a transmitter frequency response over the predetermined frequency range; decoding the received speech signal; and filtering the decoded speech signal using a receiver frequency response which is complementary to the transmitter frequency response over the predetermined frequency range to thereby reduce distortion in the speech signal introduced over the predetermined frequency range by using said transmitter frequency response.

In preferred embodiments the receiver frequency response is the inverse of the transmitter frequency response.

According to a second aspect of the invention there is provided a terminal for processing a speech signal in a network, the terminal comprising: a receiver for receiving the speech signal over the network from a transmitting device, wherein the frequency components in the received speech signal are limited to a predetermined frequency range and the received speech signal has been filtered using a transmitter frequency response over the predetermined frequency range; a decoder for decoding the received speech signal; and a filter for filtering the decoded speech signal using a receiver frequency response which is complementary to the transmitter frequency response over the predetermined frequency range to thereby reduce distortion in the speech signal introduced over the predetermined frequency range by using said transmitter frequency response.

According to a third aspect of the invention there is provided a computer program product comprising computer readable instructions for execution at a terminal in a network, the instructions comprising instructions for: receiving a speech signal over the network from a transmitting device, wherein the frequency components in the received speech signal are limited to a predetermined frequency range and the received speech signal has been filtered using a transmitter frequency response over the predetermined frequency range; decoding the received speech signal; and filtering the decoded speech signal using a receiver frequency response which is complementary to the transmitter frequency response over the predetermined frequency range to thereby reduce distortion in the speech signal introduced over the predetermined frequency range by using said transmitter frequency response.

According to a fourth aspect of the invention there is provided a network comprising at least one terminal according to the third aspect of the invention.

According to embodiments of the present invention, a speech signal is received at a receiving terminal from a transmitting device and the speech signal is decoded. The decoded speech signal is equalized to compensate for the frequency response applied to the speech signal by the transmitting device (the transmitter frequency response). In particular, the frequency response of the microphone at the transmitting device is considered. An equaliser is used at the receiving terminal to apply a receiver frequency response, which is complementary to the transmitter frequency response, to the decoded signal. For example, the receiver frequency response may be the inverse of the transmitter frequency response. However, the receiver frequency response is not necessarily the exact inverse of the transmitter frequency response because during processing of the speech signal some of the speech frequency components are destroyed or contain too much noise due to the coding of the speech signal. It would therefore not be appropriate to try to recover those components of the speech signal simply by amplification. It is therefore not preferable for the receiver frequency response to be the exact inverse of the transmitter frequency response, but the receiver frequency response can advantageously be close to the inverse of the transmitter frequency response, such that the receiver frequency response is substantially the inverse of the transmitter frequency response. The equalizer may be adaptive or static.

The receiver frequency response is applied to the whole range of frequencies of the received speech signal, rather than just to a low frequency portion or a high frequency portion of the speech signal as in the prior art. In this way, the intermediate frequency range (e.g. 300 Hz to 3.8 kHz) is taken into account, which can be beneficial. As can be seen from FIG. 1, the transmitter frequency response is not flat over the intermediate frequency range, such that the intermediate frequency range is distorted by the application of the transmitter frequency response. Embodiments of the present invention ensure that the transmitter frequency response is compensated across the whole frequency range of the speech signal. This can be achieved by applying a receiver frequency response at the receiving terminal which is complementary to the transmitter frequency response across the whole frequency range of the speech signal.

BRIEF DESCRIPTION OF THE DRAWINGS

For a better understanding of the present invention and to show how it may be carried into effect, reference will now be made by way of example to the accompanying drawings in which.

DETAILED DESCRIPTION OF PREFERRED EMBODIMENTS

Embodiments of the invention are described herein by way of particular examples and specifically with reference to exemplary embodiments. It will be understood by one skilled in the art that the invention is not limited to the details of the specific embodiments given herein.

Figure 2:
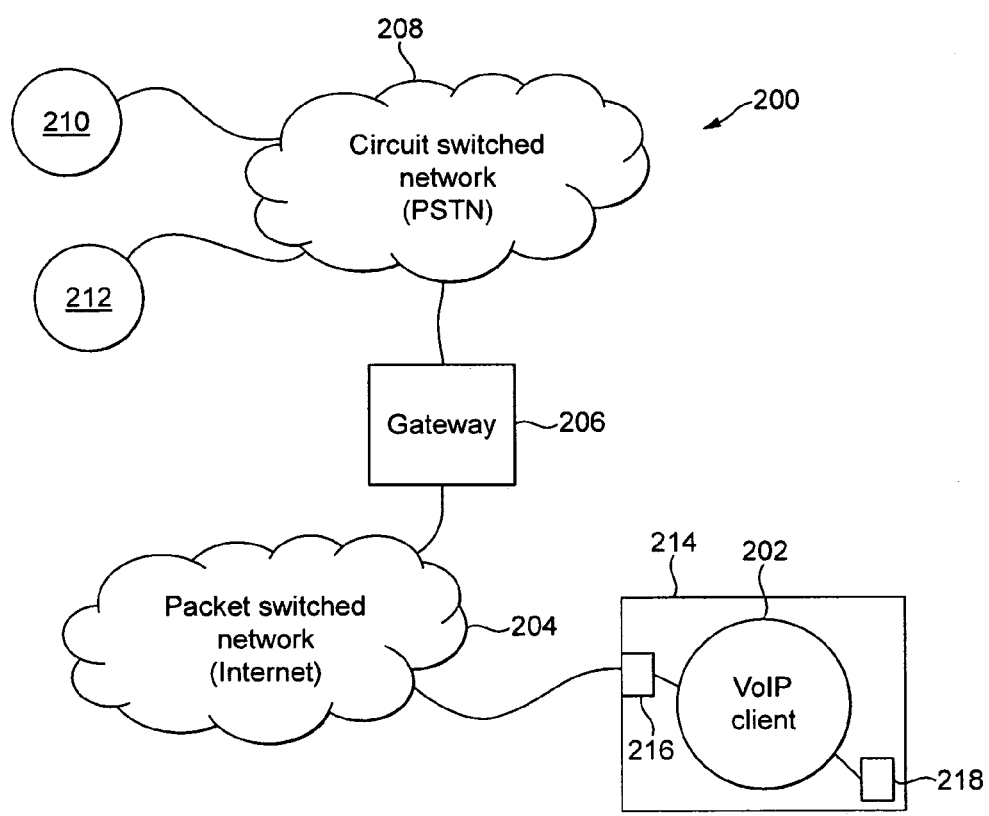
FIG. 2 is a schematic block diagram of a VoIP network suitable for implementing embodiments of the invention.

With reference to FIG. 2 there is now described a VoIP network 200 suitable for implementing embodiments of the invention. Other types of network are also suitable for implementing embodiments of the invention. A VoIP client 202 is installed and run on a receiving terminal 214. The receiving terminal 214 comprises a speaker 218 for outputting audio signals to a user. The receiving terminal 214 is coupled to a packet switched network 204, such as the internet, using a modem 216. A gateway 206 is coupled to the packet switched network 204, and also to a circuit switched network 208, for example the public switched telephone network (PSTN). Telephone devices 210 and 212 are coupled to the circuit switched network 208, and may comprise landline telephones or mobile telephones.

The gateway 206 provides a connection between the packet switched network 204, as used for Voice over IP (VoIP) telephony, and the circuit switched network 208 to allow a VoIP call originating at the VoIP client 202 to be routed to a traditional telephone 210, 212 and vice versa.

Figure 3:
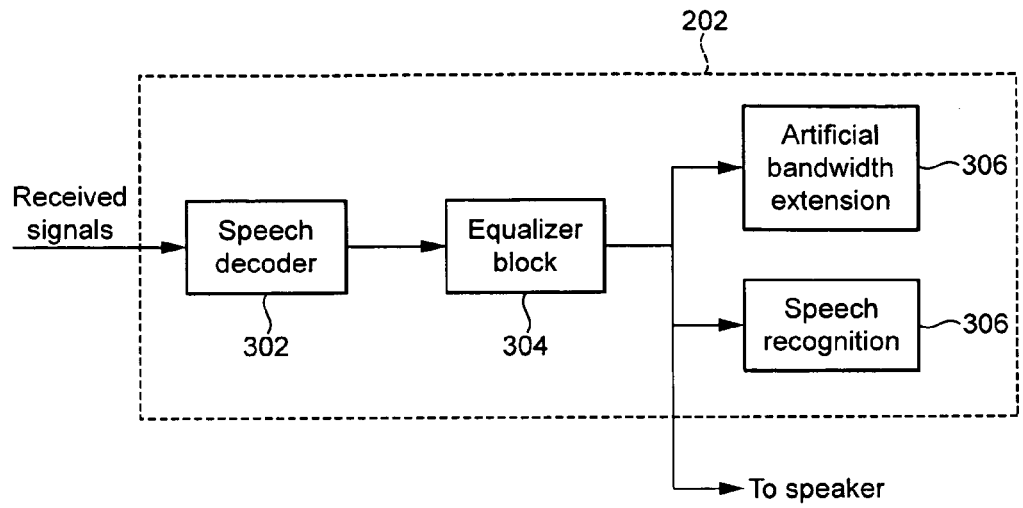
FIG. 3 is a schematic block diagram of a VoIP client according to an embodiment of the invention.

FIG. 3 shows a schematic diagram of the VoIP client running on the receiving terminal 214. The VoIP client 202 comprises a speech decoder 302, an equalizer block 304, an artificial bandwidth extension block 306 and a speech recognition block 308. The speech decoder 302 is arranged to receive speech signals from the packet switched network 204 via the modem 216. An output of the speech decoder 302 is coupled to an input of the equalizer block 304. An output of the equalizer block 304 is coupled to an input of the artificial bandwidth extension block 306, an input of the speech recognition block 308, and to the speaker 218.

Figure 4:
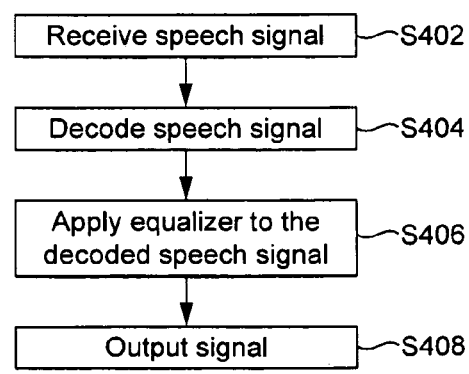
FIG. 4 is a flow chart of a method according to an embodiment of the invention.

The operation of the receiving terminal 214 is now described with reference to FIG. 4. In step S402 a speech signal is received at the modem 216 from a transmitting device (e.g. device 210 or 212). The speech signal is passed to the speech decoder 302 in the VoIP client 202.

In step S404 the speech signal is decoded in the speech decoder 302. The speech signal can be decoded using any known speech decoding technique. The decoded speech signals are passed from the speech decoder 302 to the equalizer block 304.

In step S406 the equalizer block 304 is applied to the decoded speech signals. In step S408 the speech signal is output from the equalizer block 304. The speech signals output from the equalizer block 304 may become an input for the artificial bandwidth extension block 306 or the speech recognition block 308. The speech signal output from the equalizer block 304 may be output to the user of the receiving terminal 214 via the speaker 218. The speech signal output from the equalizer block 304 may alternatively (or additionally) be used for other purposes in the receiving terminal 214 as would be apparent to a skilled person.

The equalizer block 304 corresponds to a digital filter applied to the decoded speech signals. The characteristics of the digital filter are completely specified by the coefficients of the filter. The coefficients of the filter are selected so as to provide a particular receiver frequency response. The receiver frequency response is complementary to the transmitter frequency response over the frequency range of the speech signal such that the distortion in the speech signal introduced by using said transmitter frequency response is reduced over the whole frequency range of the speech signal.

Figure 1:
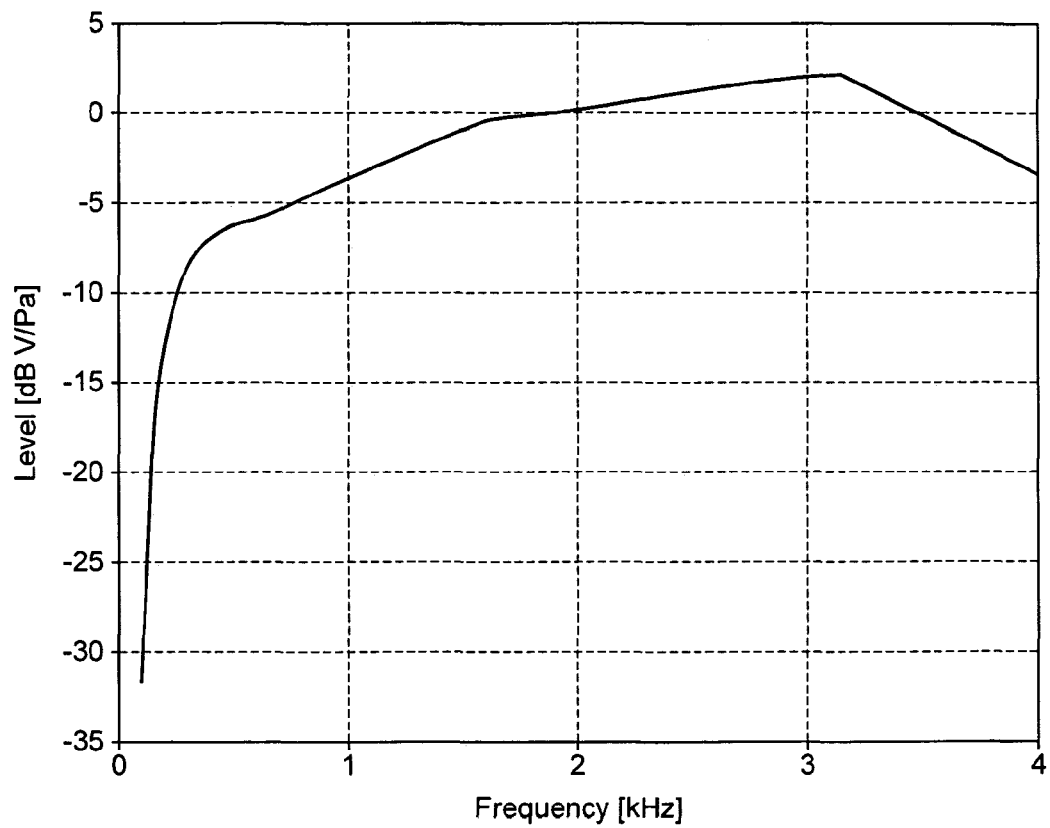
FIG. 1 shows the frequency characteristics of the Intermediate Reference System, sending side, according to ITU-T P.48.

One example of a desired receiver frequency response is substantially the inverse of the transmitter frequency response shown in FIG. 1. This example receiver frequency response is the opposite of the transmitter frequency response shown in FIG. 1 in that it has an amplification in the low and high frequency regions and an attenuation in the frequency region between 2 kHz and 3.5 kHz. This example receiver frequency response will, on average, improve the resulting speech naturalness of the decoded speech signal. However, as described above the desired receiver frequency response is not necessarily the exact inverse of the transmitter frequency response.

By applying the receiver frequency response to the decoded speech signals the detrimental effect on the naturalness of the speech signal caused by applying the transmitter frequency response at the transmitting device (e.g. device 210 or 212) can be reduced. In this way, the receiver frequency response counteracts the effect on the naturalness of the speech signal caused by the application of the transmitter frequency response. The receiver frequency response is complementary to the transmitter frequency response over the whole frequency range of the speech signal.

The receiver frequency response used by the equalizer block 304 can be fixed at design or manufacture, such that the receiver frequency response is static during operation. For such a fixed equaliser the transmitting frequency response used by the transmitting device (210 or 212) can be assumed to be the average frequency response that matches the characteristics of a particular telephonic standard, such as the sending intermediate reference system (IRS) specified in the ITU-T P.48 standard. In this case, the receiver frequency response used by the equalizer block 304 is set at design or manufacture to be complementary to the average transmitter frequency response of the particular telephonic standard. Alternatively, the receiver frequency response used by the equalizer block 304 can be set at design or manufacture to be complementary to the worst case transmitter frequency response of the particular telephonic standard (i.e. the largest distortion of the speech signal expected when using the particular telephonic standard). If it is known that the receiving terminal 214 is likely to only receive speech signals with a particular telephonic standard, then the particular telephonic standard can be used to set the receiver frequency response used in the equalizer block 304. In this way, the receiver frequency response can be set such that the spectral distortion of the speech signal is minimized for a range of different devices and scenarios using the particular telephonic standard.

Different transmitting devices can apply different transmitter frequency responses.

Figure 5:
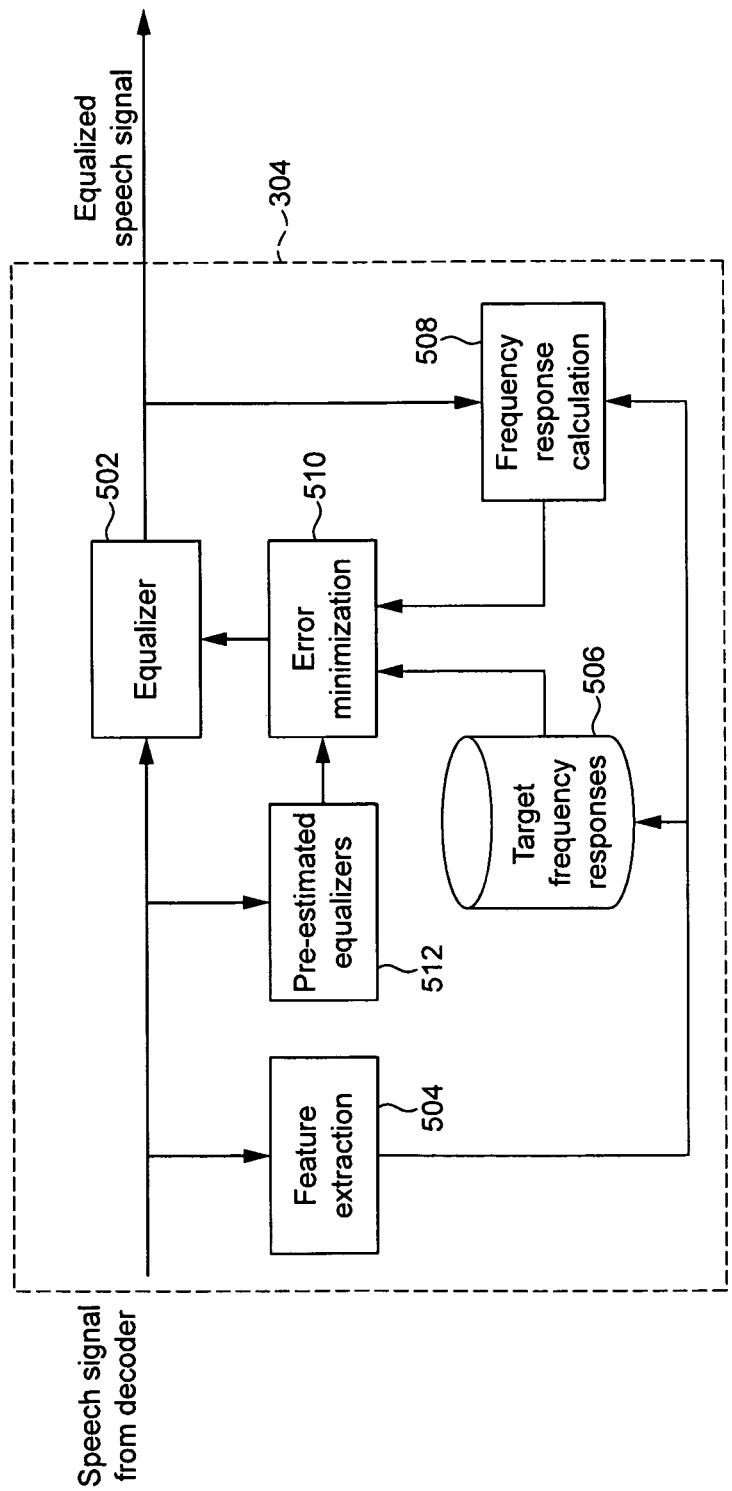
FIG. 5 is a schematic block diagram of an equalizer block according to an embodiment of the invention.

An alternative to a fixed equalizer that on average (or any other appropriate function) minimizes the spectral distortion of the speech signal for a range of different devices and scenarios is to make the equalizer block 304 adaptive. FIG. 5 is a schematic diagram of an adaptive equalizer block 304. The equalizer block 304 comprises an equalizer 502, a feature extraction block 504, a target frequency response store 506, a frequency response calculation block 508, an error minimization block 510 and a pre-estimated equalizer block 512. A decoded speech signal is received at the equalizer block 304 from the decoder 302. The decoded speech signal is provided as a first input to the equalizer 502 and also provided as an input to the feature extraction block 504 and the pre-estimated equalizer block 512. An output of the feature extraction block 504 is coupled to an input of the target frequency response store 506 and coupled to a first input of the frequency response calculation block 508. An output of the target frequency response store 506 is coupled to a first input of the error minimization block 510. An output of the frequency response calculation block 508 is coupled to a second input of the error minimization block 510. An output of the pre-estimated equalizer block 512 is coupled to a third input of the error minimization block 510. An output of the error minimization block 510 is coupled to a second input of the equalizer 502. An output of the equalizer 502 is coupled to a second input of the frequency response calculation block 508. The output of the equalizer 502 is also provided as an output of the equalizer block 304 for subsequent use in the receiving terminal 214, such as for use in the artificial bandwidth extension block 306, the speech recognition block 308 or the speaker 218.

In operation the equalizer 502 can be adapted in a number of ways. One approach is to start with the coefficients of an equalizer that has been designed as described above in relation to the fixed equalizer such that the receiver frequency response applied by the equalizer 502 is initially the average (or the worst case) that should be applied according to the telephonic standard used. The filter coefficients used by the equalizer 502 are then slowly adapted so as to minimize the spectral distortion in the speech signals. A number of target power spectrums are determined which can be derived from long-term averaging of clean voiced speech for various conditions. In this way, the target power spectrums are determined from voiced speech which has not been filtered using the transmitter frequency response. Target frequency responses corresponding to the target power spectrums are stored in the target frequency response store 506. The different target frequency responses relate to different types of voiced speech. For example, one of the target frequency responses in the target frequency response store 506 is for female voiced speech, and another one of the target frequency responses in the target frequency response store 506 is for male voiced speech.

The feature extraction block 504 receives decoded speech signals and the features of the speech signal are extracted to thereby determine the type of speech in the speech signal. The type of speech in the received speech signal can then be matched to one of the target frequency responses in the target frequency response store 506. For example, if it is determined in the feature extraction block 504 that the received speech signal contains female voiced speech then the target frequency response for female voiced speech is selected from the target frequency response store 506, and the selected frequency response can be used in the equalizer 502 to filter the decoded speech signal accordingly.

An aim of applying the receiver frequency response is to adapt the speech signals to have the same power spectrum as the target power spectrum (i.e. clean voiced speech). If the speech signals can be adapted to have the same power spectrum as clean voiced signals then the speech signals will sound more natural. The long term average power spectrum of voiced speech in the speech signals output from the equalizer 502 can be calculated in the frequency response calculation block 508. The long term average power spectrum is compared with the target power spectrum. Where there is a difference between the target power spectrum and the long term average power spectrum, the error minimization block 510 changes the filter coefficients of the equalizer 502 in order to minimize the difference. In this way the equalizer 502 can be dynamically adapted in response to receiving speech signals. The adaptation of the equalizer 502 occurs in realtime such that the adaptation can occur during a call, and can respond to changing channel conditions on the channel between the transmitting device (210 or 212) and the receiving terminal 214.

In one embodiment, the filter coefficients used in a call with a particular end point (e.g. transmitting device 210 or 212) are stored in the pre-estimated equalizer block 512 at the end of the call along with an identifier of the transmitting device. The filter coefficients may have been adapted during the call such that they are different to those of a static equalizer using filter coefficients based on the transmitter frequency response employed in a particular telephonic standard. When a subsequent call is received, the decoded speech signal is input to the pre-estimated equalizer block 512 and the identifier of the transmitting device is determined. The identifier is used to determine whether the pre-estimated equalizer block 512 has stored filter coefficients associated with the transmitting device of the subsequent call, and if so, the stored filter coefficients are initially applied at the equalizer 502 for the subsequent call. Different filter coefficients may be stored for different transmitting terminals. In this way, the equalizer block 304 can adapt for receiving speech signals from specific transmitting devices, and can maintain the optimum receiver frequency response determined in one call for use in subsequent calls with the specific transmitting device. In this way the pre-estimated equalizer block 512 acts as a look-up table for pre-estimated equalizer coefficients associated with particular caller IDs.

When the receiving terminal receives speech signals it can determine the identity of the transmitting device that is transmitting the speech signals, as is known in the art. In particular, the receiving terminal 214 can determine whether the transmitting terminal is in a network which will apply a particular telephonic standard. For example, if the transmitting device is in the Public Switched Telephone Network (e.g. device 210 or 212) then the receiving terminal 214 can determine that the received signals will have been filtered with a transmitter frequency response according to the ITU-T P.48 standard.

In some embodiments, the equalizer block 304 is adapted according to the identity of the transmitting device. For example the equalizer block 304 may be arranged to apply a receiver frequency response to the received speech signals only if the transmitting device is in the PSTN network 208. If the transmitting device is in the packet switched network 204 then the equalizer block 304 either does not apply the receiver frequency response to the received signals or applies a different receiver frequency response to the received signals.

Figure 6:
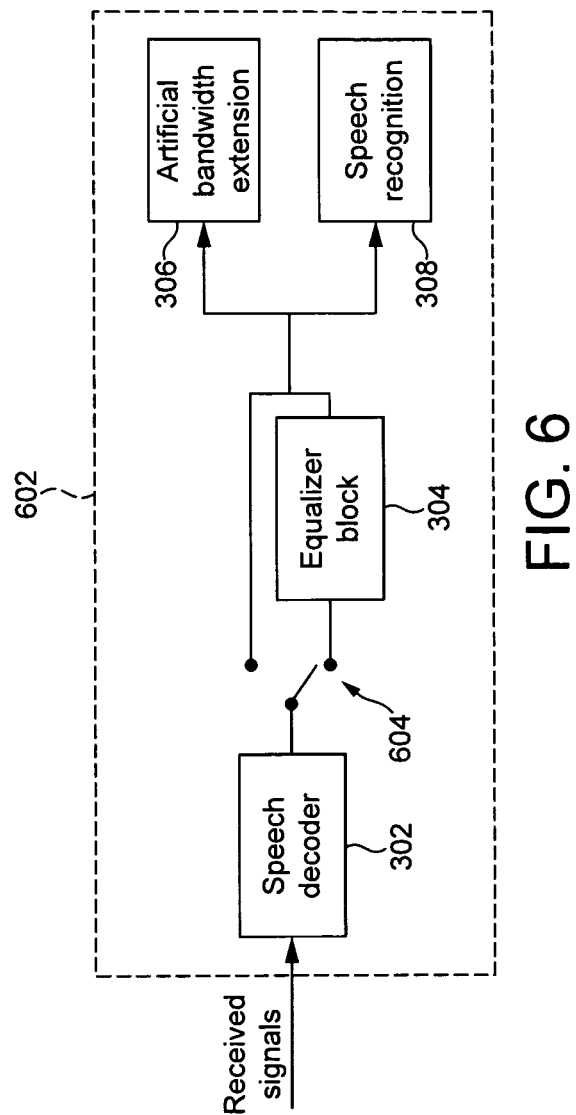
FIG. 6 is a schematic block diagram of a VoIP client according to an embodiment of the invention.

In other embodiments if it is determined that the received signals are from the packet switched network 204 then the equalizer block 304 is by-passed altogether. For example, FIG. 6 shows a schematic diagram of a VoIP client 602 running on the receiving terminal 214 according to one embodiment. The VoIP client 602 includes the speech decoder 302, the equalizer block 304, the artificial bandwidth extension block 306 and the speech recognition block 308 as described above. Additionally, VoIP client 602 includes a switch 604 connected between the speech decoder and the equalizer block 304. When the switch is in a first position the output of the speech decoder 302 is connected to the input of the equalizer block 304. However, when the switch is in a second position the output of the speech decoder 302 by-passes the equalizer block 304.

In operation, if it is determined in the receiving terminal 214 that the transmitting device is in the PSTN network 208 then the switch 604 is set to the first position such that the output of the speech decoder block 302 is connected to the equalizer block 304 as described above. However, if it is determined in the receiving terminal 214 that the transmitting device is in the packet switched network 204 then the switch 604 is set to the second position such that the output of the speech decoder block 302 by-passes equalizer block 304. In this way the speech signals are filtered by the equalizer block 304 if they are from a transmitting device in the PSTN network 208, but not if they are from a transmitting device in the packet switched network 204. The switch 604 is shown schematically as a hardware switch in FIG. 6, but the switch could also be implemented in software as would be apparent to a person skilled in the art.

The embodiments of the present invention described above compensate for the transmitter frequency response across the whole range of frequencies in the speech signal. The inventors have realized that speech signals received from fixed or mobile telephones employing the ITU-T P.48 standard have an average spectrum that shows approximately 5-10 dB amplification in the frequency range from 1 to 3.5 kHz compared to the original (natural) speech signal. This is in accordance with the ITU-T P.48 specification as shown in FIG. 1. It has been realized that preventing or reducing the distortion of the speech signal at these intermediate frequencies is beneficial. Embodiments of the present invention provide equalization of speech signals at the receiving terminal 214 which compensates for this amplification, thereby improving the naturalness of the speech in the decoded speech signals.

Furthermore, the equalizer of embodiments of the present invention has the ability to improve the working condition for signal processing algorithms such as speech recognition in the speech recognition block 308 and artificial bandwidth extension in artificial bandwidth extension block 306. Signal processing algorithms such as speech recognition and artificial bandwidth extension algorithms are commonly based on trained statistical models of relevant features of speech signals. Any distortion to the speech signals caused by the transmitter frequency response results in the speech signals differing from the training signals used in the statistical models. Typically, the variation of features of the speech signal for the same speech utterance caused by the difference in frequency response of the different devices (i.e., mobile phones etc.) must be accounted for when designing the signal processing algorithms, e.g. the speech recognition block 308 to ensure a high recognition rate. The equalization provided by embodiments of the present invention is an alternative to account for this variation in frequency characteristics. In this way the signal processing algorithms can be more reliable and/or less complex when processing speech signals to which the receiver frequency response has been applied. In this way, a mismatch between the training and the testing environments can be alleviated for signal processing algorithms that are based on the decoded speech from the telephone network.

It will be appreciated that the above embodiments are described only by way of example. For instance, some or all of the modules of the VoIP client could be implemented in dedicated hardware units, rather than in software as described above. Further processing blocks may be included in the VoIP client 202. Although the invention has been described with reference to use in a packet switched network, the invention could be applied at receiving terminals in other types of network, such as a circuit switched network.

While this invention has been particularly shown and described with reference to preferred embodiments, it will be understood to those skilled in the art that various changes in form and detail may be made without departing from the scope of the invention as defined by the appendant claims.

The invention claimed is:

1. A method of processing a speech signal, the method comprising:
  receiving the speech signal at a communication client running on a receiving terminal, the receiving terminal connected to a packet switched network, the speech signal originating at a telephone device coupled to a circuit switched network, the circuit switched network and the packet switched network coupled via a gateway, wherein frequency components in the received speech signal are limited to a predetermined frequency range and the received speech signal has been filtered by the telephone device using a transmitter frequency response over the predetermined frequency range;
  the communication client decoding the received speech signal and making a determination regarding whether the telephone device is a terminal in the circuit switched network or the packet switched network; and
  responsive to determining that the telephone device is a terminal in the circuit switched network, filtering, by the communication client, the decoded speech signal using a receiver frequency response which is complementary to the transmitter frequency response over the predetermined frequency range to thereby reduce distortion in the speech signal by adapting the speech signal to a target power spectrum derived from long-term averaging of voiced speech signals.

2. The method of claim 1 wherein the receiver frequency response is an inverse of the transmitter frequency response.

3. The method of claim 1 wherein the step of filtering the decoded speech signal is performed with a filter, the coefficients of the filter being selected to provide the receiver frequency response.

4. The method of claim 1, further comprising dynamically adapting the receiver frequency response.

5. The method of claim 4 further comprising:
  storing a plurality of predetermined frequency responses associated with respective types of speech signal; and
  analysing the received speech signal to determine a type of the received speech signal,
  wherein the receiver frequency response is adapted to be the predetermined frequency response associated with the determined type of speech signal.

6. The method of claim 4, further comprising:
  analysing the filtered speech signal to determine a filtered power spectrum of voiced speech in the filtered speech signal; and
  determining the target power spectrum,
  wherein the receiver frequency response is adapted to reduce a difference between the filtered power spectrum and the target power spectrum.

7. The method of claim 6 wherein the step of determining the target power spectrum comprises taking a long term average of a voiced speech signal that has not been filtered using the transmitter frequency response.

8. The method of claim 4, further comprising:
  storing the adapted receiver frequency response with an identifier of the telephone device,
  wherein on initiation of a subsequent communication event with the telephone device the receiver frequency response is set to be the stored receiver frequency response.

9. The method of claim 1, wherein the receiver frequency response is static.

10. The method of claim 1 wherein the receiver frequency response is selected at design to be complementary to an average transmitting frequency response over the predetermined frequency range in accordance with a telephonic standard of the circuit switched network.

11. The method of claim 1 wherein the receiver frequency response is selected at design to be complementary to a worst case transmitting frequency response over the predetermined frequency range that reflects an expected amount of distortion when using a telephonic standard of the circuit switched network.

12. The method of claim 1, further comprising:
  not filtering the decoded speech signal if the telephone device is determined to be a terminal in the packet switched network.

13. The method of claim 1, further comprising performing a signal processing algorithm on the filtered speech signal.

14. The method of claim 13 wherein the signal processing algorithm is one of a speech recognition algorithm and an artificial bandwidth extension algorithm.

15. A terminal for processing a speech signal comprising:
  processing hardware;
  a voice over internet protocol (VOIP) client executable via the processing hardware to perform operations for receiving the speech signal from a telephone device, the telephone device connected to a circuit switched network, the terminal connected to a packet switched network, the circuit switched network and the packet switched network coupled via a gateway, wherein frequency components in the received speech signal are limited to a predetermined frequency range and the received speech signal has been filtered by the telephone device using a transmitter frequency response over the predetermined frequency range;
  the VOIP client including a decoder for decoding the received speech signal and making a determination regarding whether the telephone device is a terminal in the circuit switched network or the packet switched network; and
  the VOIP client including a filter for filtering the decoded speech signal responsive to determining that the telephone device is a terminal in the circuit switched network, the filtering using a receiver frequency response which is complementary to the transmitter frequency response over the predetermined frequency range to thereby reduce distortion in the speech signal by adapting the speech signal to a target power spectrum derived from long-term averaging of voiced speech signals.

16. The terminal of claim 15 wherein coefficients of the filter are selected to provide the receiver frequency response.

17. The terminal of claim 15, further comprising means for performing one of a speech recognition algorithm and an artificial bandwidth extension algorithm on the filtered speech signal.

18. A computer terminal in a packet switched network, comprising:

the computer terminal configured to receive a speech signal over the packet switched network, the speech signal originating at a telephone device coupled to a circuit switched network, the circuit switched network and the packet switched network coupled via a gateway, wherein frequency components in the received speech signal are limited to a predetermined frequency range and the received speech signal has been filtered using a transmitter frequency response over the predetermined frequency range;

a set of computer-readable instructions that, when executed by the computer terminal, cause the computer terminal to implement a voice over internet protocol (VOIP) client to perform operations including:

decoding the received speech signal;

making a determination regarding whether the telephone device is a terminal in the circuit switched network or the packet switched network; and responsive to determining that the telephone device is a terminal in the circuit switched network, filtering the decoded speech signal using a receiver frequency response which is complementary to the transmitter frequency response over the predetermined frequency range to thereby reduce distortion in the speech signal by adapting the speech signal to a target power spectrum derived from long-term averaging of voiced speech signals.

19. The method of claim 1 wherein the circuit switched network is the Public Switched Telephone Network (PSTN).

* * * * *